United States Patent [19]

Okada et al.

[11] Patent Number: 4,974,924
[45] Date of Patent: Dec. 4, 1990

[54] PLUG FOR OPTICAL FIBER CABLE

[75] Inventors: Hiroshi Okada, Tokyo; Masatoshi Toda, Sagamihara; Shingo Suzuki, Zama, all of Japan

[73] Assignee: Mitsubishi Rayon Company Ltd., Tokyo, Japan

[21] Appl. No.: 347,207

[22] Filed: May 4, 1989

[30] Foreign Application Priority Data

May 6, 1988 [JP] Japan .............................. 63-59317[U]
May 20, 1988 [JP] Japan .............................. 63-66616[U]

[51] Int. Cl.$^5$ .......................... G02B 6/36; G02B 7/26
[52] U.S. Cl. ................................ 350/96.20; 350/96.21
[58] Field of Search .......................... 350/96.20, 96.21

[56] References Cited

U.S. PATENT DOCUMENTS

| | | | |
|---|---|---|---|
| 4,789,216 | 12/1988 | Schrott | 350/96.20 |
| 4,795,229 | 1/1989 | Abendschein et al. | 350/96.20 |
| 4,807,958 | 2/1989 | Gunner et al. | 350/96.20 |
| 4,812,006 | 3/1989 | Osborn et al. | 350/96.21 |

Primary Examiner—William L. Sikes
Assistant Examiner—Robert E. Wise
Attorney, Agent, or Firm—Oblon, Spivak, McClelland, Maier & Neustadt

[57] ABSTRACT

A plug for an optical fiber cable comprises a plug proper having a line-inserting portion for insertion of an optical fiber and a primary covering layer in a state communicating with the interior, an optical fiber-inserting portion for inserting only the optical fiber, a cylindrical portion formed on the outer wall of the line-inserting portion to caulk and fix the line, and a pressing portion having a concave-convex part formed to anchor the filamentary reinforcing fiber exposed from the end of the optical fiber cable onto the periphery of the pressing portion, and at least one ferrule for caulking the filamentary reinforcing fiber exposed from the end of the optical fiber cable to the concave-convex part of the pressing portion of the plug proper, and further, caulking the secondary covering layer. By adopting the above-mentioned structure, an optical fiber cable plug is obtained in which the primary covering material is caulked and secured, and therefore, problems such as a turning and protrusion of the line of the optical fiber do not arise.

5 Claims, 2 Drawing Sheets

PLUG FOR OPTICAL FIBER CABLE

BACKGROUND OF THE INVENTION

1. Field of the Invention

The present invention relates to an optical fiber cable plug for connecting an optical fiber comprising a filamentary polyamide fiber as a reinforcing fiber.

2. Description of the Related Art

As a conventional plug for an optical fiber, there is known, for example, a plug proposed by the present inventors in Japanese Utility Model Application No. 62-166744. In this plug for an optical fiber, a thread for engagement with an adaptor is formed on the wall of a plug proper on the side of a line-inserting hole, and a concave-convex portion, specifically a concave-convex portion formed by knurling, is provided on the outer periphery of the adaptor for setting and engaging a reinforcing fiber of the end portion of the optical fiber cable. This adaptor has an inner hole having a diameter larger than the outer diameter of the plug proper and a thread to be engaged with the thread formed on the plug proper is formed on the inner wall surface of the adaptor, and an annular lug having an outer diameter larger than the diameter of an inner hole of a coupling nut is formed on one end of the adaptor.

Where the coupling nut for fixing the plug proper to a flange or the like from the side of the line-inserting hole is inserted to an extent such that the coupling nut impinges against a stopper portion, the adaptor is screwed into the plug proper from the threaded portion thereof so that the lug of the adaptor impinges substantially against the side face of the coupling nut, whereby the coupling nut is rotatably set on the plug proper in the axial direction of the plug proper.

In the conventional techniques, however, the materials to be fixed are limited to a reinforcing fiber and a secondary covering, and since an optical fiber line and a primary covering can move freely within the plug, problems arise such as a turning and protrusion of the optical fiber line or the optical fiber within the plug.

SUMMARY OF THE INVENTION

The present invention relates to an optical fiber cable plug for connecting an optical fiber cable comprising an optical fiber, a primary covering layer and a secondary covering layer containing a filamentary reinforcing fiber, said plug comprising a plug proper having a line-inserting portion for insertion of the optical fiber and primary covering layer such that they are communicated with the interior, an optical fiberinserting portion for inserting only the optical fiber, a cylindrical portion formed on the outer wall of the line-inserting portion to caulk and fix the line and a pressing portion having a concave-convex part formed to anchor the filamentary reinforcing fiber exposed from the end of the optical fiber cable onto the periphery of the pressing portion, and at least one ferrule having a function of caulking the filamentary reinforcing fiber exposed from the end of the optical fiber cable to the concave-convex part of the pressing portion of the plug proper, and further, caulking the secondary covering layer.

According to the present invention, by adopting a structure capable of caulking and fixing the primary covering, a plug for an optical fiber, in which problems such as a turning and protrusion of the optical fiber line do not arise, can be provided.

The pressing portion is divided into a first pressing part and a second pressing part, and the outer diameter of the first pressing part is adjusted to a value between the outer diameter of the line contained in the optical fiber cable and the outer diameter of the secondary covering layer, and convexities and concavities for anchoring the filamentary reinforcing fiber to the outer periphery of the pressing portion are formed on the pressing portion. If this structure is adopted for the pressing portion, the outer diameter of the first pressing part can be reduced and the amount of the filamentary reinforcing fiber arranged in the concave-convex part can be increased. Accordingly, when the inner ferrule inserted in the concave-convex part is caulked, a high clamping strength can be obtained.

DESCRIPTION OF THE PREFERRED EMBODIMENTS

The optical fiber cable plug of the present invention will now be described with reference to the accompanying drawings.

Figure 1:
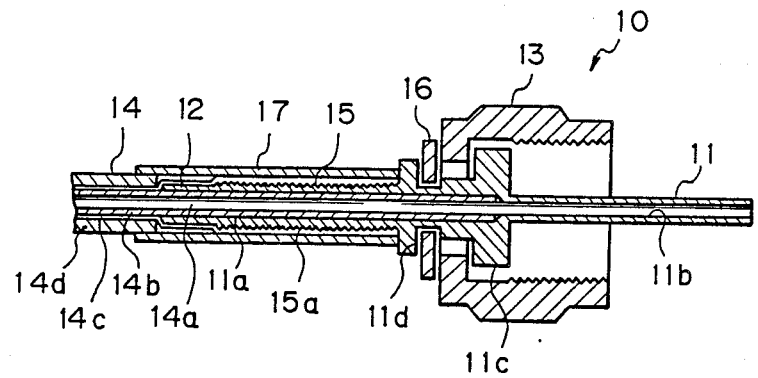
FIG. 1 is a sectional view showing the optical fiber cable inserted and fixed into an optical fiber cable plug according to one embodiment of the present invention.

FIG. 1 is a sectional view showing the optical fiber cable inserted and fixed into the optical fiber cable plug of the present invention. The optical fiber cable plug 10 of the present invention will now be described with reference to FIG. 1.

A plug proper 11 comprises a line-inserting
portion 11a for inserting therein a line comprising an optical fiber 14a and a primary covering layer 14b of an optical fiber cable and a fiber-inserting portion 11b for guiding only the optical fiber midway. A cylindrical portion 12 for caulking and fixing the line and a pressing portion 15 having a concave-convex part 15a for arranging and engaging a reinforcing fiber 14c of the end portion of the optical fiber cable 14 are formed on the outer wall of the line-inserting portion 11a. The cylindrical portion 12 is caulked from the outside to fix the line inserted in the line-inserting portion. As shown in FIG. 1, the outer diameter of the pressing portion 15 is substantially equal to the outer diameter of a secondary covering layer 14d.

A ferrule 17 is caulked from the outside to fix the reinforcing fiber 14c and secondary covering layer 14d arranged at the concave-convex part 15a to the plug proper 11.

Reference numeral 13 represents a coupling nut for fixing the optical fiber cable plug 10 to a receptacle or the like from the fiber-inserting portion 11b. The coupling nut 13 is engaged with a ring 16 of an annular groove 11d of the plug proper 11 so that the coupling nut 13 is inserted to an extent such that the coupling nut 13 impinges against a stopper portion 11c, whereby separation of the coupling nut 13 from the plug proper 11 is prevented.

A method of fixing an optical fiber cable containing a filamentary reinforcing fiber in a secondary covering layer to the optical fiber cable plug shown in FIG. 1 will now be described. Referring to FIG. 1, the reinforcing fiber 14c and the line except the secondary covering layer 14d are withdrawn from the end of the optical fiber cable 14 along a length to be fixed to the interior of the plug proper 11 of the optical fiber cable plug 10, the primary covering layer 14b is removed from this line, and the line is inserted such that the optical fiber 14a is exposed. The line comprising the optical fiber 14a and the primary covering layer 14b, which is inserted in the plug proper 11, is secured within the line-inserting portion 11a by caulking the cylindrical portion 12. Furthermore, the reinforcing fiber 14c is uniformly arranged at the concave-convex part 15a of the pressing portion 15.

Then the ferrule 17 is inserted from the end but not connected to the plug of the optical fiber cable 14, and is wrapped around the concave-convex part 15a, at which the reinforcing fiber 14a is uniformly arranged, and the secondary covering layer 14d of the optical fiber cable 14. By caulking the ferrule 17 in this state, the optical fiber cable plug 10 and the optical fiber cable 14 are secured.

The optical fiber cable plug 10 of the present invention is not limited to the plug having the abovementioned structure, and any structure capable of connecting an optical fiber cable having a secondary covering layer containing a filamentary reinforcing fiber can be adopted. Other embodiments of the optical fiber cable plug of the present invention will now be described with reference to the accompanying drawings. In the following illustration, the same reference numerals as used in FIG. 1 represent the same members as those of FIG. 1.

Figure 2:
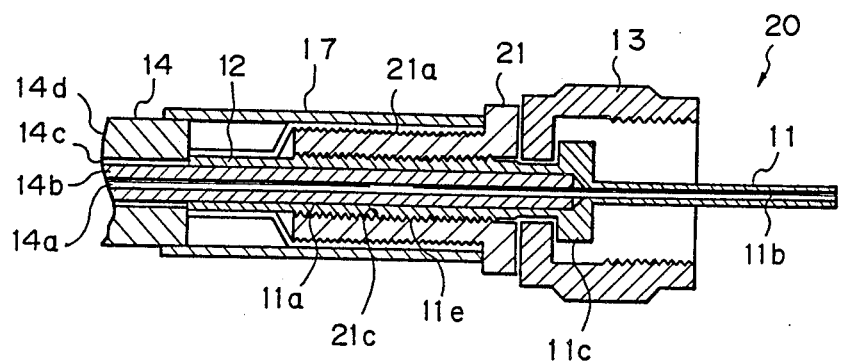
FIG. 2 is a sectional view showing the optical fiber cable inserted and fixed into an optical fiber cable plug comprising an adaptor having a pressing portion, which is coupled with a plug proper, according to another embodiment of the present invention.

In the optical fiber cable plug 20 shown in FIG. 2, an adaptor 21 provided with a pressing portion 21a having a concave-convex part formed on the outer periphery thereof is attached to the plug proper 11. The adaptor 21 can be screwed into the plug proper 11, for example, through a threaded part 11e formed on a part of the outer periphery of the line-inserting portion 11a and a threaded part 21c formed in the interior of the adaptor 21, whereby the adaptor 21 and the plug proper 11 are secured. This fixing of the adaptor 21 and the plug proper 11 can be made firmer by using a punch or the like on the end of the adaptor 21 to break the threaded part once the adaptor 21 is firmly screwed into the plug proper 11. The connection between the optical fiber cable plug shown in FIG. 2 and the optical fiber cable is accomplished in the same manner as in the case of the optical fiber cable shown in FIG. 1.

Figure 3:
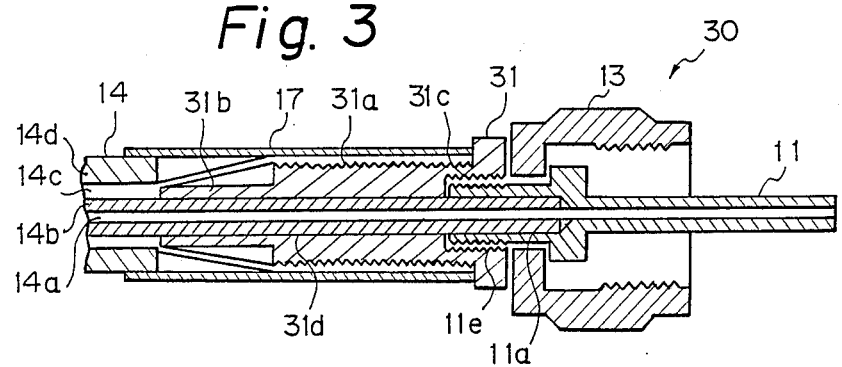
FIG. 3 is a sectional view of the optical fiber cable inserted and fixed into an optical fiber cable plug comprising an adaptor having a cylindrical portion and a pressing portion, which is coupled with a plug proper, according to still another embodiment of the present invention.

In the optical fiber cable plug 30 shown in FIG. 3, an adaptor 31 having a cylindrical portion 31b, a pressing portion 31a having a concave-convex part formed on the outer periphery thereof and an inserting portion 31d connected to the line-inserting portion 11a of the plug proper 11 is attached to the plug proper 11. The adaptor 31 is secured by engaging a threaded portion 31a formed on the end of the adaptor 31 for connection to the plug proper 11 with the threaded portion 11e formed on the outer periphery of the plug proper 11. Since the inserting portion 31d of the adaptor 31 is coupled with the line-inserting portion 11a of the plug proper 11, if the line withdrawn from the optical fiber cable is inserted into the inserting portion 31d of the adaptor 31, the line reaches the line-inserting portion 11a of the plug proper 11. In the optical fiber cable plug 30 shown in FIG. 3, the line of the optical fiber cable is secured by inserting the line into the inserting portion 31d of the adaptor 31 and the line-inserting portion 11a of the plug proper 11 and caulking the cylindrical portion 31b of the adaptor 31. Note, fixing the reinforcing fiber 14a and secondary covering layer 14d to the plug proper 11 is accomplished in the same manner as in the case of the optical fiber cable plug shown in FIG. 1.

Figure 4:
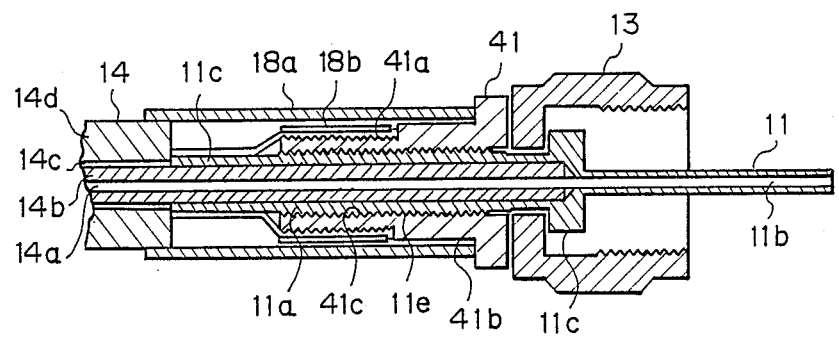
FIG. 4 is a sectional view showing the optical fiber cable inserted and fixed into an optical fiber cable plug comprising an adaptor having a first pressing part and a second pressing part, which is coupled with a plug proper, according to still another embodiment of the present invention; and, FIG. 5 is a sectional view showing the optical fiber cable inserted into an optical fiber cable plug comprising an adaptor having a cylindrical portion as the first pressing part, which is coupled with a plug proper, according to still another embodiment of the present invention.

In the optical fiber cable plug 40 shown in FIG. 4, an adaptor 41 having a pressing portion 41a having a concave-convex part formed on the outer periphery and a second pressing portion 41b is attached to the plug proper 11. The adaptor 41 has in the interior thereof a threaded portion 41c to be inserted into the plug proper 11, and the adaptor 41 is secured to the plug proper 11 by screwing this threaded portion 41c into the threaded portion 11e of the plug proper 11. On the outer periphery of the adaptor 41, the first pressing portion 41a having a diameter smaller than the outer diameter of the secondary covering layer 14d of the optical fiber cable 14 and the second pressing portion 41b having a diameter substantially equal to the outer diameter of the secondary covering layer 44d are formed. An inner ferrule 18b is disposed to caulk the reinforcing fiber 14c arranged at the concave-convex part of the first pressing portion 41a, and an outer ferrule 18a is disposed to caulk the secondary covering layer 14d.

The method of fixing the optical fiber cable 14 to the optical fiber cable plug 40 will now be described. The line and reinforcing fiber 14c are withdrawn from the end of the optical fiber cable 14 and are inserted into the inner ferrule 18b. The adaptor 41 is attached to the plug proper 11 in advance, and the line of the optical fiber cable 14 is inserted in the line-inserting portion 11a, the reinforcing fiber 14c is arranged in the first pressing portion 41a, and the inner ferrule 18b is inserted and wrapped around the first pressing portion 41. In this state, the cylindrical portion 11c of the plug proper 11 is first caulked to fix the line, and then the inner ferrule 18b is caulked to fix the reinforcing fiber 14c. The outer ferrule 18a is inserted into the plug proper 11 from the end to which the optical fiber cable 14 is not connected so that the second pressing portion 41b is wrapped by the outer ferrule 18a, and the outer ferrule 18a is caulked, whereby the optical fiber cable 14 is connected to the optical fiber cable plug 40.

Figure 5:
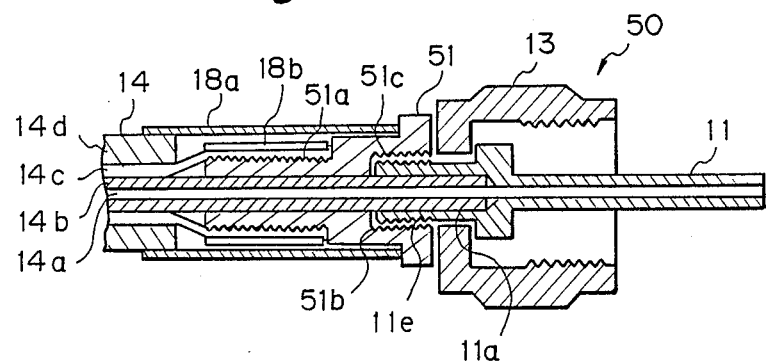

In the optical fiber cable plug 50 shown in FIG. 5, a concave-convex part is formed on the periphery of a first pressing portion 51a of an adaptor 51 to caulk and secure the line. Accordingly, in the optical fiber cable plug 50 shown in FIG. 5, when the optical fiber cable 14 is fixed, by inserting the line into an inserting fiber 14c in the first pressing portion 51a and inserting the inner ferrule 18b into the first pressing portion 51a and caulking the inner ferrule 18b, the line and the reinforcing fiber 14c can be simultaneously secured. The connection of the secondary covering layer 14d of the optical fiber cable 14 to the optical fiber cable plug 50 is performed in the same manner as in the case of the optical fiber cable plug shown in FIG. 4.

We claim:

1. An optical fiber cable plug for connecting an optical fiber cable comprising an optical fiber, a primary covering layer and a secondary covering layer containing a filamentary reinforcing fiber, said plug comprising a plug proper having a line-inserting portion for insertion of the optical fiber and primary covering layer in a state communicating with the interior, an optical fiber-inserting portion for inserting only the optical fiber, a cylindrical portion formed on the outer wall of the line-inserting portion to caulk and fix the line, the outer diameter of the cylindrical portion being slightly larger than the outer diameter of the optical fiber cable, and a pressing portion having a concave-convex part formed to anchor the filamentary reinforcing fiber exposed from the end of the optical fiber cable onto the periphery of the pressing portion, the outer diameter of the pressing portion being slightly smaller than the outer diameter of the secondary covering layer of the optical fiber cable, and at least one ferrule for caulking the filamentary reinforcing fiber exposed from the end of the optical fiber cable to the concave-convex part of the pressing portion of the plug proper and further caulking the secondary covering layer.

2. An optical fiber cable plug as set forth in claim 1, wherein the pressing portion is an adaptor which is connected separately from the cylindrical portion and line-inserting portion of the plug proper.

3. An optical fiber cable plug as set forth in claim 1, wherein the cylindrical portion and pressing portion are formed by an adaptor which is connected separately from the plug proper and has an inserting portion connected to the line-inserting portion of the plug proper.

4. An optical fiber cable plug as set forth in claim 1, wherein the pressing portion is divided into a first pressing part and a second pressing part, the outer diameter of the first pressing part is adjusted to a value between the outer diameter of the line contained in the optical fiber cable and the outer diameter of the secondary covering layer, a concave-convex part capable of anchoring the filamentary reinforcing fiber on the outer periphery thereof is formed on the first pressing part, the outer diameter of the second pressing part is substantially equal to the secondary covering layer contained in the optical fiber cable, and the ferrule comprises an inner ferrule for caulking the filamentary reinforcing fiber exposed from the end of optical fiber cable onto the concave-convex part formed on the first pressing part and an outer ferrule for caulking the secondary covering layer of the optical fiber cable.

5. An optical fiber cable plug as set forth in claim 4, wherein the outer diameter of the first pressing part is slightly larger than the outer diameter of the line contained in the optical fiber cable, and the line is caulked and secured by the first pressing part.

* * * * *